United States Patent
Gursu et al.

(10) Patent No.: US 12,108,390 B2
(45) Date of Patent: Oct. 1, 2024

(54) TEMPORARY BANDWIDTH PART SWITCH SUITABLE FOR REDUCED CAPABILITY DEVICE

(71) Applicant: Nokia Technologies Oy, Espoo (FI)

(72) Inventors: Halit Murat Gursu, Munich (DE); Rapeepat Ratasuk, Inverness, IL (US); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 409 days.

(21) Appl. No.: 17/392,751

(22) Filed: Aug. 3, 2021

(65) Prior Publication Data

US 2023/0042400 A1   Feb. 9, 2023

(51) Int. Cl.
| H04W 72/12 | (2023.01) |
| H04W 24/10 | (2009.01) |
| H04W 56/00 | (2009.01) |
| H04W 72/04 | (2023.01) |
| H04W 72/0453 | (2023.01) |
| H04W 72/1273 | (2023.01) |

(52) U.S. Cl.
CPC ....... H04W 72/1273 (2013.01); H04W 24/10 (2013.01); H04W 56/001 (2013.01); H04W 72/0453 (2013.01)

(58) Field of Classification Search
CPC .......... H04W 72/1273; H04W 24/10; H04W 56/001; H04W 72/0453; H04W 48/16; H04W 76/28; H04L 5/0078; H04L 5/0098
See application file for complete search history.

(56) References Cited

U.S. PATENT DOCUMENTS

| 2019/0150183 A1* | 5/2019 | Aiba ..................... H04W 24/10 370/336 |
| 2020/0367196 A1* | 11/2020 | Chen ..................... H04L 5/0053 |
| 2021/0029768 A1* | 1/2021 | Shih ................. H04W 36/0079 |
| 2021/0298038 A1* | 9/2021 | Kang .................... H04L 5/0057 |
| 2022/0322308 A1* | 10/2022 | He ..................... H04L 41/0896 |
| 2023/0092704 A1* | 3/2023 | Zhang .................. H04L 5/0092 370/329 |

(Continued)

OTHER PUBLICATIONS

3GPP TS 38.133 V18.5.0, "3rd Generation Partnership Project; Technical Specification Group Radio Access Network; NR; Requirements for support of radio resource management (Release 18)", Mar. 2024, 134 pages.

(Continued)

*Primary Examiner* — Walli Z Butt
*Assistant Examiner* — Thad N Defauw
(74) *Attorney, Agent, or Firm* — Harrington & Smith (57) ABSTRACT

A UE is connected to a serving cell via an active BWP of a first BWP, and receives a message having criteria for switching from the first BWP to a second BWP. In response to at least one of the criteria being met, the UE waits until a first preconfigured time to switch from the first BWP to the second BWP, and switches the active BWP from the first BWP to the second BWP. The UE communicates with the serving cell and performs SSB measurements while using the second BWP as the active BWP. The UE switches from the second BWP to the first BWP after a second preconfigured time corresponding to a duration of time in the second BWP. The serving cell sends the message having the criteria, switches active BWPs accordingly, and communicates with the UE in the active BWPs.

19 Claims, 7 Drawing Sheets

(56) References Cited

U.S. PATENT DOCUMENTS

2023/0180173 A1* 6/2023 Kazmi .................. H04L 5/001
455/456.1

OTHER PUBLICATIONS

3GPP TS 38.306 V16.1.0, "3rd Generation Partnership Project; Technical Specification Group Radio Access Network; NR; User Equipment (UE) radio access capabilities (Release 16)", Jul. 2020, 106 pages.
3GPP TS 38.213 V18.2.0, "3rd Generation Partnership Project; Technical Specification Group Radio Access Network; NR; Physical layer procedures for control (Release 18)", Mar. 2024, 304 pages.
3GPP TS 38.211 V17.2.0, "3rd Generation Partnership Project; Technical Specification Group Radio Access Network; NR; Physical channels and modulation (Release 17)", Jun. 2022, 136 pages.
3GPP TS 38.101-2 V17.2.0, "3rd Generation Partnership Project; Technical Specification Group Radio Access Network; NR; User Equipment (UE) radio transmission and reception; Part 2: Range 2 Standalone (Release 17)". Jun. 2021, 186 pages.
3GPP TS 38.321 V16.5.0, "3rd Generation Partnership Project; Technical Specification Group Radio Access Network; NR; Medium Access Control (MAC) protocol specification (Release 16)", Jun. 2021, 153 pages.
3GPP TS 38.331 V18.1.0, "3rd Generation Partnership Project; Technical specification Group Radio Access Network; NR; Radio resource Control (RRCEO protocol specification (Release 18)", Mar. 2024, 1649 pages.

\* cited by examiner

TEMPORARY BANDWIDTH PART SWITCH SUITABLE FOR REDUCED CAPABILITY DEVICE

TECHNICAL FIELD

Exemplary embodiments herein relate generally to wireless networks and, more specifically, relate to temporary bandwidth part switching suitable for, e.g., reduced capacity devices in those networks.

BACKGROUND

New Radio (NR) has support for reduced capability (RedCap) devices. These RedCap devices include use cases such as wearables (e.g., smart watches, wearable medical devices, artificial reality/virtual reality goggles, and the like), industrial wireless sensors, and video surveillance.

In general, RedCap devices may have relatively high (but possibly infrequent) data rate requirements but reduced bandwidth, relatively high latency requirements, but long battery life. That is, these the above-mentioned use cases typically have less stringent data rate requirements than enhanced mobile broadband (eMBB) use cases, and do not require tight or deterministic latency requirement as time-critical communications use cases.

Since the RedCap devices have reduced bandwidth, they use a bandwidth part (BWP) that is typically smaller than the default system bandwidth part. The smaller BWP comes with a problem of control signaling, i.e., reference signals control channels occupying most of the bandwidth. To serve a certain number of the RedCap devices with scheduling channels, some RedCap devices may need to switch between BWPs, such as from one BWP in the system bandwidth to another BWP in the system bandwidth. Switching between BWPs can take a relatively long time.

Additionally, due to the potentially large number of RedCap devices in the cell and their smaller BWP size, several BWPs may be needed in the cell to accommodate RedCap devices. If each BWP contains Synchronization Signal Blocks (SSBs), the system overhead from SSB can be substantial. Therefore, only one or few RedCap BWP(s) may contain SSB(s). In this case, RedCap devices in BWP not containing SSB(s) must retune to another frequency to perform measurements.

Although RedCap devices are lower complexity and lower bandwidth, they still have to perform normal network functions, such as taking Radio Resource Management (RRM) measurements during measurement gaps designed to allow the devices to perform the RRM measurements. There are potential issues with these measurements, however, in particular because of the time required to switch between BWPs for RedCap devices.

BRIEF SUMMARY

This section is intended to include examples and is not intended to be limiting.

In an exemplary embodiment, a method is disclosed that includes receiving, by a user equipment connected to a serving cell via an active bandwidth part comprising a first bandwidth part, a message comprising one or more criteria for switching from the first bandwidth part to a second bandwidth part. The method includes, in response to at least one of the one or more criteria being met, waiting by the user equipment until a first preconfigured time to switch from the first bandwidth part to the second bandwidth part. The method also includes switching by the user equipment the active bandwidth part from the first bandwidth part to the second bandwidth part. The method further includes communicating by the user equipment with the serving cell and performing by the user equipment synchronization signal block measurements while using the second bandwidth part as the active bandwidth part. The method includes switching by the user equipment from the second bandwidth part to the first bandwidth part after a second preconfigured time corresponding to a duration of time in the second bandwidth part.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to receive, by a user equipment connected to a serving cell via an active bandwidth part comprising a first bandwidth part, a message comprising one or more criteria for switching from the first bandwidth part to a second bandwidth part; in response to at least one of the one or more criteria being met, wait by the user equipment until a first preconfigured time to switch from the first bandwidth part to the second bandwidth part; switch by the user equipment the active bandwidth part from the first bandwidth part to the second bandwidth part; communicate by the user equipment with the serving cell and performing by the user equipment synchronization signal block measurements while using the second bandwidth part as the active bandwidth part; and switch by the user equipment from the second bandwidth part to the first bandwidth part after a second preconfigured time corresponding to a duration of time in the second bandwidth part.

An exemplary computer program product includes a computer-readable storage medium bearing computer program code embodied therein for use with a computer. The computer program code includes: code for receiving, by a user equipment connected to a serving cell via an active bandwidth part comprising a first bandwidth part, a message comprising one or more criteria for switching from the first bandwidth part to a second bandwidth part; code, in response to at least one of the one or more criteria being met, for waiting by the user equipment until a first preconfigured time to switch from the first bandwidth part to the second bandwidth part; code for switching by the user equipment the active bandwidth part from the first bandwidth part to the second bandwidth part; code for communicating by the user equipment with the serving cell and performing by the user equipment synchronization signal block measurements while using the second bandwidth part as the active bandwidth part; and code for switching by the user equipment from the second bandwidth part to the first bandwidth part after a second preconfigured time corresponding to a duration of time in the second bandwidth part.

In another exemplary embodiment, an apparatus comprises means for performing: receiving, by a user equipment connected to a serving cell via an active bandwidth part comprising a first bandwidth part, a message comprising one or more criteria for switching from the first bandwidth part to a second bandwidth part; in response to at least one of the one or more criteria being met, waiting by the user equipment until a first preconfigured time to switch from the first bandwidth part to the second bandwidth part; switching by the user equipment the active bandwidth part from the first bandwidth part to the second bandwidth part; communicating by the user equipment with the serving cell and performing by the user equipment synchronization signal block measurements while using the second bandwidth part as the active bandwidth part; and switching by the user equipment from the second bandwidth part to the first bandwidth part after a second preconfigured time corresponding to a duration of time in the second bandwidth part.

In an exemplary embodiment, a method is disclosed that includes, at a serving cell connected to a user equipment via a first bandwidth part as an active bandwidth part, sending by the serving cell a message to the user equipment comprising one or more criteria for switching from the first bandwidth part to a second bandwidth part. The method includes determining, based on a first preconfigured time the user equipment is to switch from the first bandwidth part to the second bandwidth part, when the user equipment is to have switched to the second bandwidth part. The method also includes communicating by the serving cell with the user equipment while the user equipment uses the second bandwidth part as the active bandwidth part. The method includes, after a second preconfigured time corresponding to a duration of time in the second bandwidth part, switching by the serving cell to the first bandwidth part for use for communication with the user equipment as the active bandwidth part.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: at a serving cell connected to a user equipment via a first bandwidth part as an active bandwidth part, send by the serving cell a message to the user equipment comprising one or more criteria for switching from the first bandwidth part to a second bandwidth part; determine, based on a first preconfigured time the user equipment is to switch from the first bandwidth part to the second bandwidth part, when the user equipment is to have switched to the second bandwidth part; communicate by the serving cell with the user equipment while the user equipment uses the second bandwidth part as the active bandwidth part; and after a second preconfigured time corresponding to a duration of time in the second bandwidth part, switch by the serving cell to the first bandwidth part for use for communication with the user equipment as the active bandwidth part.

An exemplary computer program product includes a computer-readable storage medium bearing computer program code embodied therein for use with a computer. The computer program code includes: code for, at a serving cell connected to a user equipment via a first bandwidth part as an active bandwidth part, sending by the serving cell a message to the user equipment comprising one or more criteria for switching from the first bandwidth part to a second bandwidth part; code for determining, based on a first preconfigured time the user equipment is to switch from the first bandwidth part to the second bandwidth part, when the user equipment is to have switched to the second bandwidth part; code for communicating by the serving cell with the user equipment while the user equipment uses the second bandwidth part as the active bandwidth part; and code for, after a second preconfigured time corresponding to a duration of time in the second bandwidth part, switching by the serving cell to the first bandwidth part for use for communication with the user equipment as the active bandwidth part.

In another exemplary embodiment, an apparatus comprises means for performing: at a serving cell connected to a user equipment via a first bandwidth part as an active bandwidth part, sending by the serving cell a message to the user equipment comprising one or more criteria for switching from the first bandwidth part to a second bandwidth part; determining, based on a first preconfigured time the user equipment is to switch from the first bandwidth part to the second bandwidth part, when the user equipment is to have switched to the second bandwidth part; communicating by the serving cell with the user equipment while the user equipment uses the second bandwidth part as the active bandwidth part; and after a second preconfigured time corresponding to a duration of time in the second bandwidth part, switching by the serving cell to the first bandwidth part for use for communication with the user equipment as the active bandwidth part.

DETAILED DESCRIPTION OF THE DRAWINGS

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The exemplary embodiments herein describe techniques for temporary bandwidth part switch for reduced capability devices. Additional description of these techniques is presented after a system into which the exemplary embodiments may be used is described.

Figure 1:
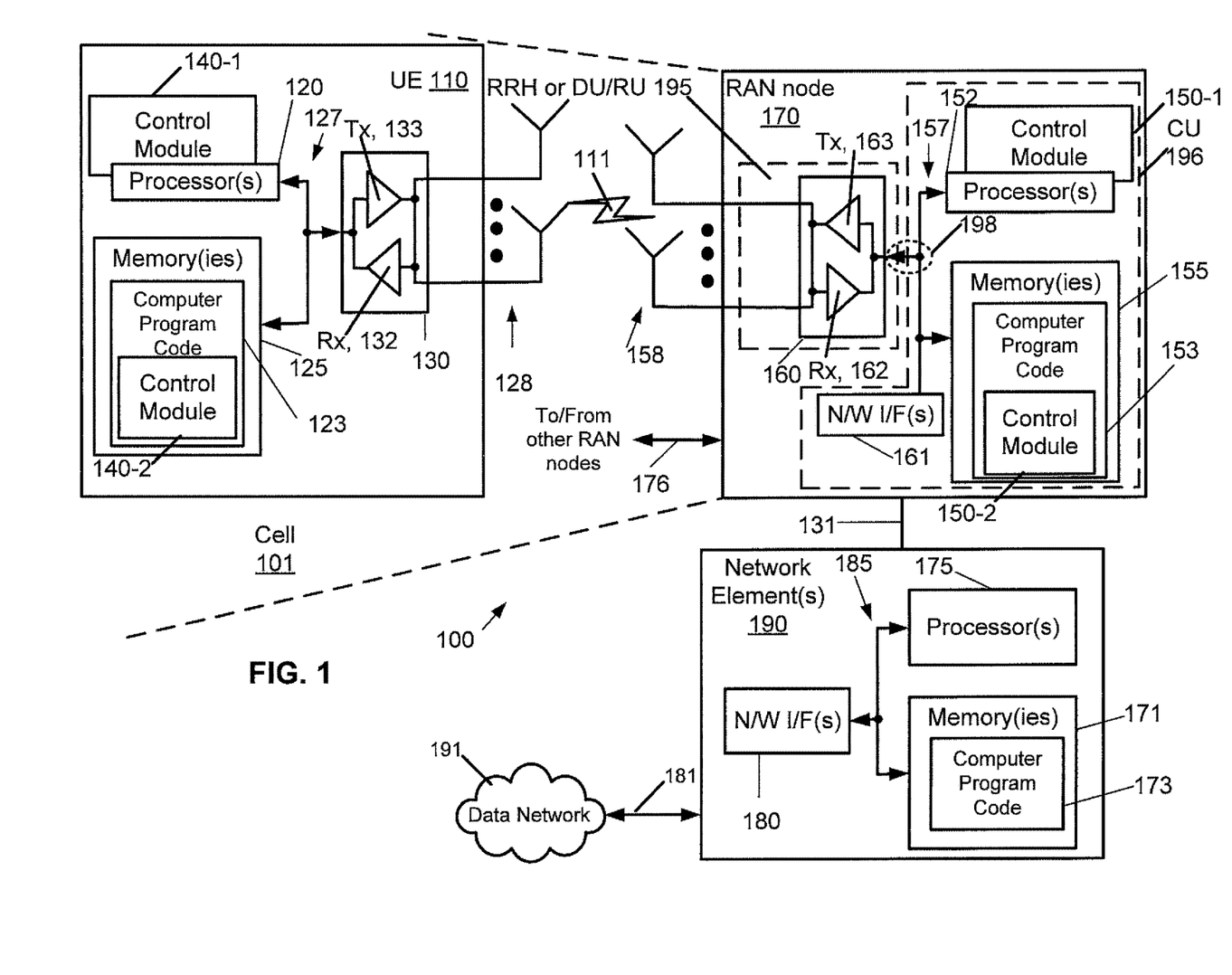
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 is referred to herein as a gNB 170, though this is but one example. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-DU supports one or multiple cells. In the example of FIG. 1, the UE 110 is in a cell 101. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell 101 makes up part of a base station. That is, there can be multiple cells (of which only cell 101 is shown) per base station. For instance, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones (such as smart phones, mobile phones, cellular phones, voice over Internet Protocol (IP) (VoIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 110 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Having thus introduced one suitable but non-limiting technical context for the practice of the exemplary embodiments, the exemplary embodiments will now be described with greater specificity. In particular, exemplary embodiments herein propose enhancements for NR related to measurement gaps for reduced capability devices. Background on measurement gaps and RedCap devices is provided in the following.

For measurement gaps, measurement gaps are described in NR (3GPP TS 38.133) as the following.
1) Similarly to LTE, certain UEs in RRC Connected mode in NR need to be configured by the serving cell with a measurement gap to measure intra/inter-frequency and inter-RAT neighbor cells, i.e., RRM measurements of neighbor cells of the UE's serving cell.
   a) A measurement gap is a period that the UE may use to perform such RRM measurements and where the UE is not expected to perform any transmission/reception with the serving cell, i.e., the serving cell should not make any transmissions to the UE nor expect to receive transmissions from the UE.
2) The need of measurement gaps depends on the UE capability (indication through interFreqNeedForGaps or interRAT-NeedForGaps in LTE and nr-NeedForGap- Reporting-r16 or interFrequencyMeas-NoGap-r16 (3GPP TS 38.306 version 16.1.0 Rel-16), the active BWP and current operating frequency of the UE as specified in 3GPP TS 38.133.

3) Measurement gap lengths (MGLs) of 1.5, 3, 3.5, 4, 5.5, and 6 ms are currently supported to ensure a good match with the SMTC window length.

a) The MGL should account also for the RF retuning time of 0.5 ms and 0.25 ms for carrier frequency measurements in FR1 and FR2, respectively [3GPP TS 38.133].

b) The MGL can be set to the SMTC window length+2× retuning time.

Figure 2:
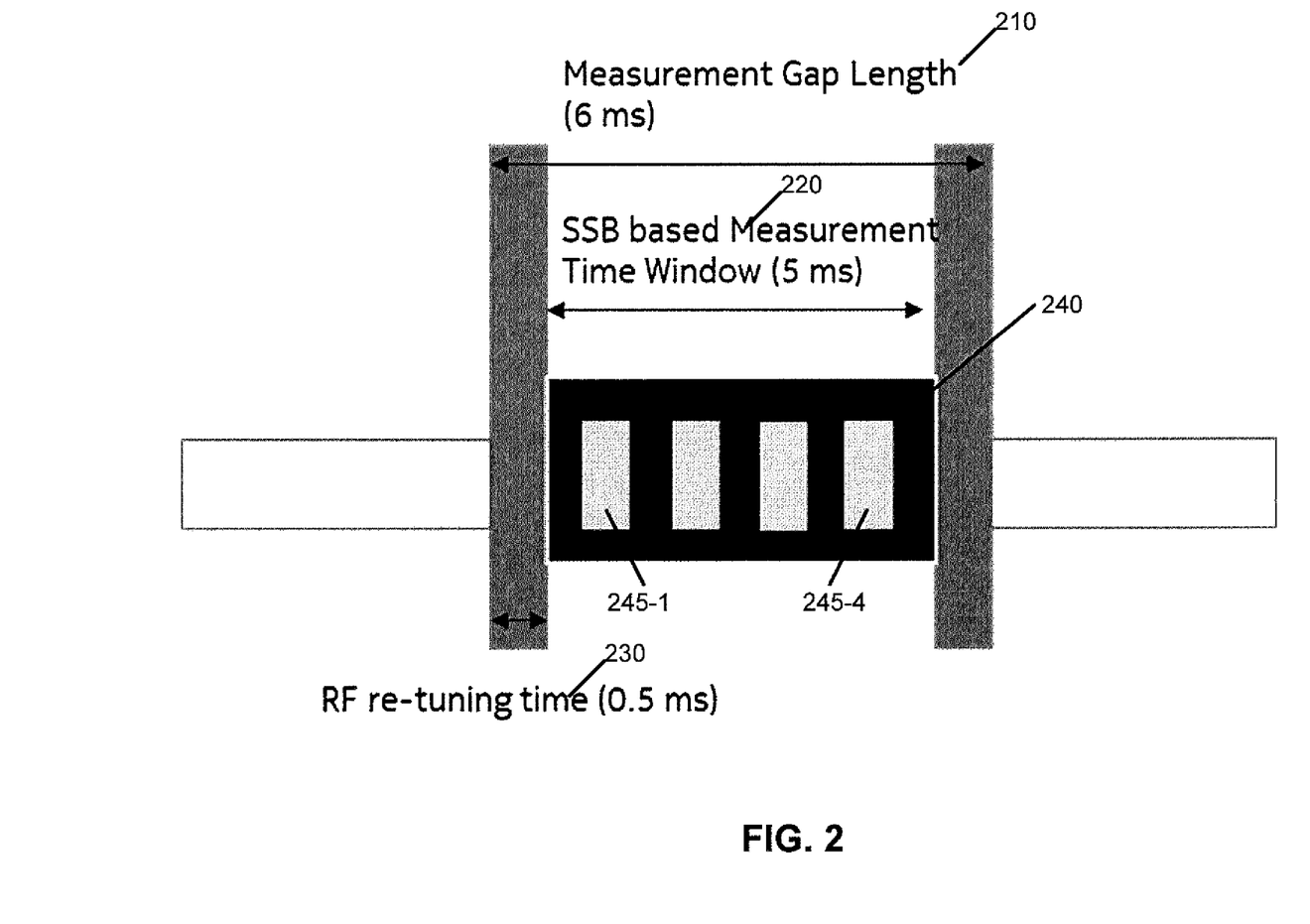
FIG. 2 illustrates details related to measurement gap configuration and how the RF-retuning time and SS burst are considered for the measurement gap configuration.

The above-mentioned details are shown in FIG. 2. In FIG. 2, the measurement gap length 210 is 6 ms, the SSB based measurement time window 220 is 5 ms, and the RF retuning time 230 is 0.5 ms. The time-frequency resource space 240 is shown, to be used for measurements, and reference 245-1 through 245-4 illustrate SSB locations.

Concerning UE beam management and radio link monitoring, the UE 110 uses two processes for overseeing mobility procedures, 1) for inter-cell mobility the radio link monitoring (RLM), and 2) for intra-cell mobility procedures, beam management and beam failure detection (BFD).

RLM is described in specification 3GPP TS. 38.213 (Section 5), as follows:

"The downlink radio link quality of the primary cell is monitored by a UE for the purpose of indicating out-of-sync/in-sync status to higher layers.

the UE uses for radio link monitoring the RS provided for the active TCI state for PDCCH reception if the active TCI state for PDCCH reception includes only one RS The physical layer in the UE indicates, in frames where the radio link quality is assessed, out-of-sync to higher layers when the radio link quality is worse than the threshold Qout for all resources in the set of resources for radio link monitoring. When the radio link quality is better than the threshold Qin for any resource in the set of resources for radio link monitoring, the physical layer in the UE indicates, in frames where the radio link quality is assessed, in-sync to higher layers."

RLM may result in Radio Link Failure as such UE goes into a recovery state for finding a new available cell, see RLF in 3GPP TS 38.331 (Section 5.3.10). The measurement requirements for RLM are defined in 3GPP TS 38.133 (Section 8.1).

For intra-cell mobility, the beam management is detailed in 3GPP TS 38.213, Section 6, as follows.

"The physical layer in the UE assesses the radio link quality according to the set of resource configurations against the threshold Qout,LR. For the set, the UE assesses the radio link quality only according to periodic CSI-RS resource configurations, or SS/PBCH blocks on the PCell or the PSCell, that are quasi co-located, as described in [6, TS 38.214], with the DM-RS of PDCCH receptions monitored by the UE. The UE applies the Qin,LR threshold to the L1-RSRP measurement obtained from a SS/PBCH block. The UE applies the Qin,LR threshold to the L1-RSRP measurement obtained for a CSI-RS resource after scaling a respective CSI-RS reception power with a value provided by powerControlOffsetSS.

The thresholds Qout,LR and Qin,LR correspond to the default value of rlmInSyncOutOfSyncThreshold, as described in [10, TS 38.133] for Qout, and to the value provided by rsrp-ThresholdSSB or rsrp-ThresholdBFR-r16, respectively."

Link recovery procedures may result in a beam failure detection (BFD). BFD triggers a beam failure recovery (BFR). These procedures are summarized in 3GPP TS 38.321 section 5.17:

"The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity."

With respect to reduced capability devices, one of the study items has been investigated to introduce a new device type in 5G. The introduction of the device type, RedCap, short for Reduced Capability, device, takes its motivation from providing a cheap alternative handset that supports a subset of the NR/5G capabilities. Some of the important factors of the RedCap devices include the following.

1) They have reduced number of Tx/Rx antennas.
2) They have reduced bandwidth.
3) They are expected to be low cost.
4) They have low energy consumption.
5) RedCap UE BW is 20 MHz in FR1, while system BW can be much larger (e.g., 100 MHz). The RedCap UE, however, can retune to other parts in the system BW to receive or transmit.
6) The retuning time is approximately 50-200 μs.
7) It is beneficial to define several BWPs for RedCap UEs in order to distribute the load across the system bandwidth and avoid congestion (i.e., load balancing).
8) Also, it is beneficial/unavoidable to configure RedCap BWPs away from CORESET #0/SSB, as that frequency region is relatively crowded (SSB, SIB1, Paging, SI, and the like).

Figure 3:
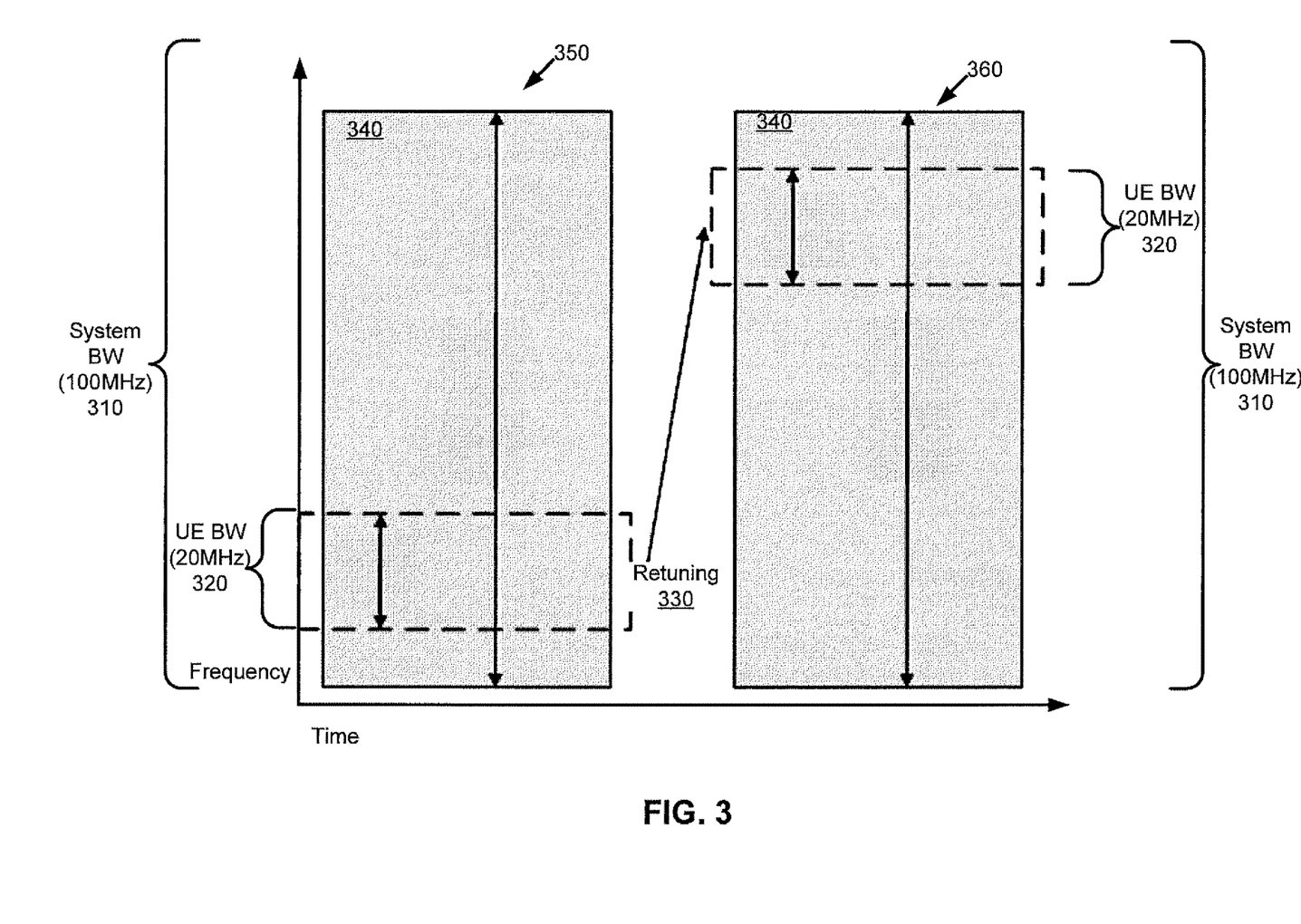
FIG. 3 illustrates RedCap BW compared to the system BW, where a UE uses some time to retune from one BWP to another.

FIG. 3 illustrates RedCap BW compared to the system BW, where a UE uses some time to retune from one BWP to another. FIG. 3 illustrates two time periods 350, 360, and a time-frequency resource space 340 with each period. For each time-frequency resource space 340, there is a system BW 310 of 100 MHz in this example and the RedCap UE BW 320 of 20 MHz. A retuning 330 is performed by the UE 110 from the time period 350 and the corresponding BWP in the system BW 310 shown to the BWP in the system BW 310 shown in time period 360.

Figure 4:
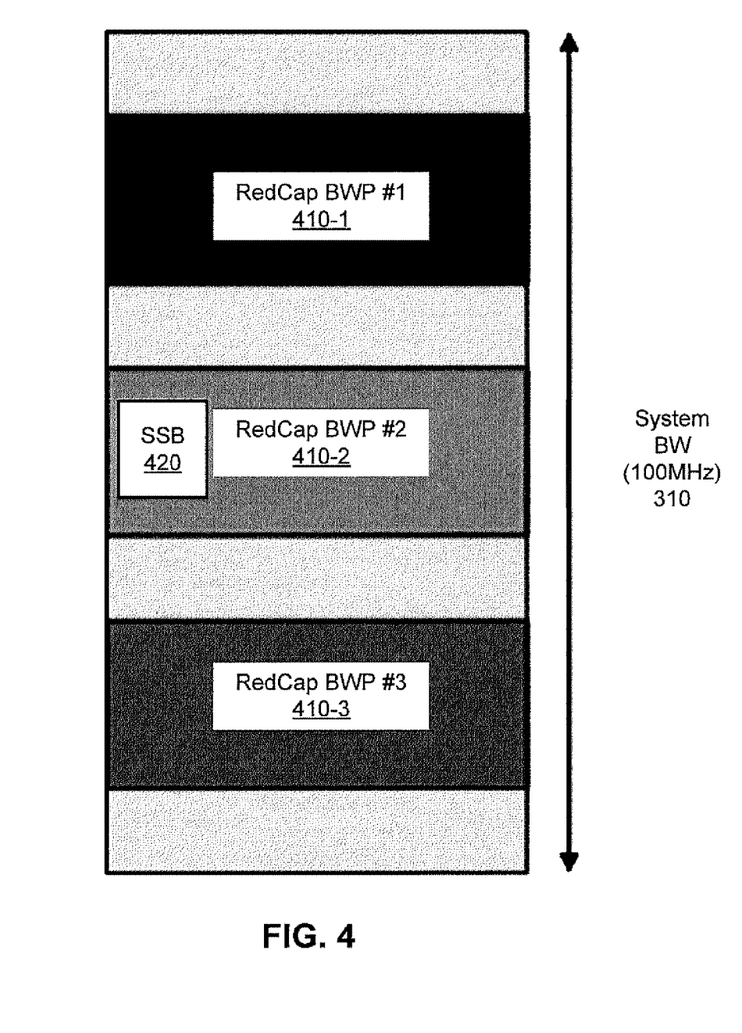
FIG. 4 illustrates multiples of RedCap BWP that can be deployed to realize load balancing among the NR BW.

FIG. 4 illustrates multiples of RedCap BWP that can be deployed to realize load balancing among the NR BW (system BW 310). There are three BWPs 410-1, 410-2, and 410-3, each for a different set of RedCap UEs. In this example, BWPs 410-1 and 410-3 do not contain SSB 420, and BWP 410-2 contains SSB 420.

For a BWP, 3GPP TS 38.221 summarizes, as the following:

"4.4.5 Bandwidth Part

A bandwidth part is a subset of contiguous common resource blocks defined in clause 4.4.4.3 for a given numerology $\mu_i$ in bandwidth part i on a given carrier. The starting position $N_{BWP,i}^{start,\mu}$ and the number of resource blocks $N_{BWP,i}^{size,\mu}$ in a bandwidth part shall fulfil $N_{grid,x}^{start,\mu} \leq N_{BWP,i}^{start,\mu} < N_{grid,x}^{start,\mu} + N_{grid,x}^{start,\mu}$ and $N_{grid,x}^{start,\mu} < N_{BWP,i}^{start,\mu} \leq N_{grid,x}^{start,\mu} + N_{grid,x}^{size,\mu}$, respectively. Configuration of a bandwidth part is described in clause 12 of [5, TS 38.213].

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part.

Unless otherwise noted, the description in this specification applies to each of the bandwidth parts. When there is no risk of confusion, the index µ may be dropped from $N_{BWP,i}^{start,\mu}$, $N_{BWP,i}^{size,\mu}$, $N_{grid,x}^{start,\mu}$, and $N_{grid,x}^{size,\mu}$."

In this document, for activation of a bandwidth part and de-activation of a bandwidth part, these are referred to as a "BWP switch".

Now that an overview of the technical area has been provided, some problems with the current techniques are described. Consider the following scenario. If a RedCap UE is in a BWP not containing SSB 420, i.e., BWP #1 410-1 and BWP #3 410-3 in FIG. 4, a measurement gap needs to be configured for the UE 110 to retune (to BWP #2 410-2) and perform SSB measurements. The SSB measurements in this document concern serving cell and intra-frequency neighbor-cell measurements. SSBs of neighbors are expected to be at the same place in the resource grid (the time-frequency resource space), as such a legacy (non-RedCap) UE can perform the intra-frequency neighbor measurement without any measurement gap. The network would configure a measurement gap using, e.g., an SSB-based RRM Measurement Timing Configuration (SMTC) window.

Figure 5:
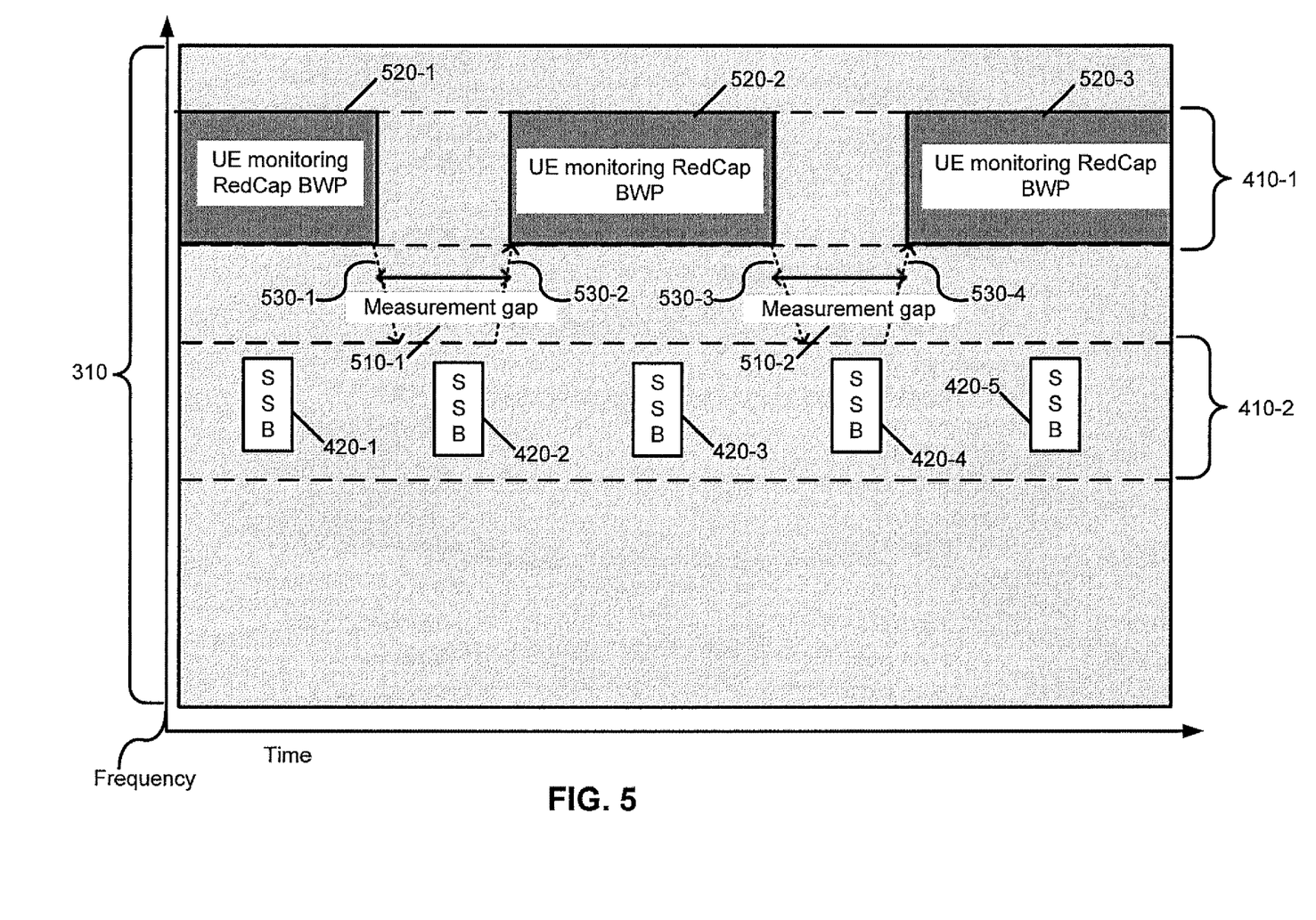
FIG. 5 illustrates a measurement gap configuration example for a RedCap UE on a BWP that does not cover SSBs.

Turning to FIG. 5, this figure illustrates a measurement gap configuration example for a RedCap UE on a BWP that does not cover SSBs. The UE 110 performs monitoring of a RedCap BWP in reference numbers 520-1, 520-2, and 520-3, in the BWP #1 410-1 (see FIG. 4). There are five SSBs illustrated: 420-1, 520-2, 420-3, 420-4, and 420-5, and these may be in BWP #2 410-2. There are measurement gaps 510-1 (between 520-1 and 520-2) and 510-2 (between 520-2 and 520-3), and these allow the UE to perform measurements not in the assigned BWP 410-1 but instead in another bandwidth that may be part of the BWP 410-2. The arrows 530-1 and 530-2 indicates a BW retuning, where the UE can measure SSB 420-2 during the measurement gap 510-1. Similarly, the arrows 530-1 and 530-2 indicates a BW retuning, where the UE can measure SSB 420-4 during the measurement gap 510-2. Arrows 530 are not perpendicular to the time axis, as these illustrate corresponding retuning periods.

Assume an example with SMTC periodicity=40 ms and duration=6 ms. This means that the UE will not be available (via measurement gaps 510) for 6 ms every 40 ms, which means 15 percent of the time, the UE is not available for scheduling. This can reduce UE throughput and cause high interruption time if urgent data arrives during that measurement gap. During this time, the UE cannot continue user plane communication even though the UE is not measuring neighbor cells.

It is therefore a problem that, in case the UE has urgent data, or needs user plane connectivity when the UE is measuring the SSBs that are not in its configured or original BWP, the UE has to be switched to its configured or original BWP. This is problematic, as repetitive BWP signaling is sent to the UE, wasting UE energy and network resources.

While a network can transmit SSB in all RedCap BWPs, this introduces overhead. In an effort to reduce overhead, SSBs in RedCap BWPs can be transmitted less often. One issue is these techniques will not scale with increasing number of RedCap devices, as the network needs to dedicate a lot of bandwidth for transmission of SSBs. This is particularly true because the SSB contains synchronization signals, PBCH, and reference signals, and these are all overhead.

In case urgent data arrives during a measurement gap, a UE can stop measuring the measurement gap. After this, the UE can switch back to the original BWP frequency. An issue with this is that this is a time-consuming procedure. The UE has to tolerate the retuning time the UE needs to go back to the BWP. This varies between 0.1 to 0.5 ms. Further, this only works for UL data, and the UE would not know about the urgent DL data.

Exemplary embodiments herein address these and other issues. An overview is first provided, then additional details are provided. In an exemplary embodiment, a method is proposed for an efficient bandwidth part switch for Reduced Capability devices. The bandwidth part switch may be enabled via, e.g., a signal sent to UE to convert the configured measurement gap timings as bandwidth path switch trigger and duration. The process is referred to herein as a temporary SSB measurement-specific BWP switch.

The temporary BWP switch may be achieved via configuring a BWP part switch command to the UE and conditionally or periodically relating the command to a measurement gap timing.

As examples of techniques that might be used for a gNB 170, the gNB may perform the following.
1) Sending configurations to initiate a switch to a BWP comprising at least one SSB of the serving cell.
  1.a. An example concerns a UE initiating the SSB-measurement-specific BWP switch at the start time of the measurement gap #1.
  1.b. The configurations may be sent in a broadcast or dedicated message.
2) Deciding that the UE may need to have access to user plane communication while measuring the serving cell as such to trigger SSB-measurement-specific BWP switch instead of a measurement gap for the RedCap UE.
  2.a. In another embodiment, the UE can be configured to trigger the SSB-measurement-specific BWP switch without any user plane communication but due to other reasons, such as preparation for emergency traffic that may arise during the measurement gap.
3) Deciding that the UE should trigger a periodic SSB-measurement-specific BWP switch cancelling the measurement gap, which enables the UE to measure the SSB while keeping the user-plane communication.
4) Deciding whether the configuration to initiate a BWP switch comes with "BWP control information" or not:
  4.a. If not, scheduling the UE at "the current BWP" for "the BWP to be switched to".
  4.b. BWP control information refers to, e.g., the following:
  4.b.i. Control information for each BWP includes PDCCH/PUCCH configuration for each BWP.
  4.c. If a BWP comes without control information, the gNB should schedule the UE for the BWP to be switched to (thereby informing the UE about the location of the PDSCH where the UE will receive DL data for instance).

As examples of techniques that might be used for a UE 100, the UE may perform the following.
1) Using the measurement gap timings to trigger a switch to BWP comprising at least one SSB of the serving cell.

2) Triggering a switch back to initial BWP after a certain time.
3) Adjusting the certain time with respect to measurement gap parameters.

Figure 6:
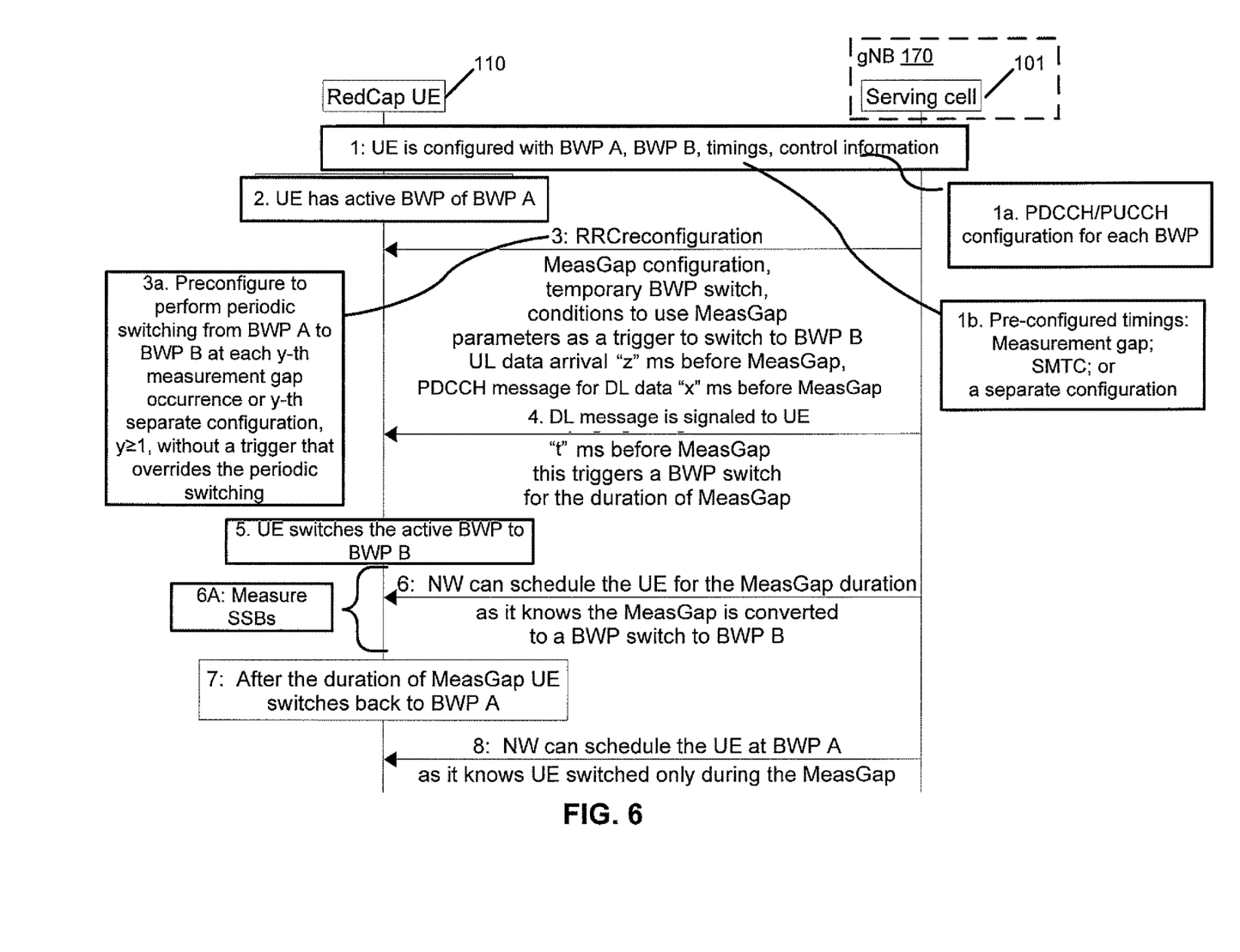
FIG. 6 is a signaling diagram for temporary bandwidth part switch for reduced capability devices, in accordance with an exemplary embodiment.

Now that an overview has been provided, additional details are provided. Exemplary implementation details are shown, at least in part, in FIG. 6. FIG. 6 is a signaling diagram for temporary bandwidth part switch for reduced capability devices, in accordance with an exemplary embodiment. A UE 110 and a serving cell 101 are shown, where the serving cell 101 is formed and controlled by gNB 170. FIG. 6 also illustrates the operation of an exemplary method or methods, a result of execution of computer program instructions embodied on a computer readable memory, functions performed by logic implemented in hardware, and/or interconnected means for performing functions in accordance with exemplary embodiments. The operations in FIG. 6 are performed by the UE 110, e.g., under control of control module 140, and gNB 170, e.g., under control of control module 150.

In step 1, the RedCap UE 110 is configured with BWP A, BWP B and control information for each BWP. The control information for each BWP may include (1a) PDCCH/PUCCH configuration for each BWP. The "timings" may correspond (1b) to one of the following: a measurement gap; SMTC; or a separate configuration. The separate configuration is a configuration separate from the measurement gap and SMTC, and is also separately set, such as by the network. Preconfigured in this example means that the configuration occurs at least before there is an active BWP switch.

For step 2, the UE 110 has active BWP of BWP A. An active BWP means the UE can perform user plane communication on that BWP. In further detail, active activated and deactivated BWPs are described in "Bandwidth Part (BWP) operation" in section 5.15 of 3GPP TS 38.321 V16.5.0 (2021 June). In this example, BWP A does not contain cell-defining SSBs of the cell, such that the UE cannot measure the SSBs, and the UE has to be configured with measurement gaps to measure SSBs in another BWP (BWP B in this case).

The UE 110, in step 3, is configured with a measurement gap configuration through, e.g., RRCreconfiguration as one example. As indicated in step 3a, the network may preconfigure the UE 110 to perform periodic switching from BWP A to BWP B at each y-th measurement gap occurrence or y-th separate configuration, y≥1 without receiving a trigger that overrides the periodic switching. The y-th separate configuration is configured separately, as described herein. A (e.g., separate) trigger may also cause switching and overrides the periodic switching. That is, if the UE is preconfigured to switch every third measurement gap configuration, the serving cell 101 may send a separate trigger to cause the UE to switch at, e.g., a second measurement gap configuration. In other words, the UE will follow the periodic switching as long as the serving cell does not send a trigger to the user equipment that overrides the periodic switching. In response to the serving cell sending a trigger to the user equipment that overrides the periodic switching, the UE will switch according to the trigger, and then return to the periodic switching afterwards. The preconfiguring occurs at least before the first switch is performed. This acts as a criterion so that the UE can determine to perform (and to trigger) switching every y-th measurement.

This example also includes a temporary BWP switch and condition(s). The condition(s) may be used to determine to use MeasGap parameters as timing to initiate an SSB-measurement-specific switch to BWP B in case of UL data arrival "z" ms before MeasGap, and observing from PDCCH message(s) the DL data arrival "x" ms before MeasGap, as described below.

a. The MeasGap (measurement gap) configuration comes with a "SSB-measurement-specific BWP switch condition" to translate the MeasGap timing to SSB-measurement-specific BWP switch timings.
a.i. If a condition holds and/or the UE 110 receives an SSB-measurement-specific BWP switch command (e.g., through DCI), the UE will wait for the MeasGap timing to perform the SSB-measurement-specific BWP switch instead of performing MeasGap activation.
a.i.1. The gNB is aware that the condition holds at the UE side.
a.i.2. In an alternative embodiment, the MeasGap does not come with the "SSB-measurement-specific BWP switch condition", but the DCI based BWP switch command comes with a "MeasGap timing flag". In an exemplary embodiment, the MeasGap timing flag indicates that, for the SSB-measurement-specific BWP switch, the MeasGap timing should be used.
a.ii. This means that the UE switches to the SSB-measurement-specific BWP when the UE would activate MeasGap, in accordance with MeasGap offset.
a.iii. This means the UE stays at the switched BWP for the duration of the MeasGap.
a.iv. After the duration of MeasGap ends, the UE switches back to the initial BWP.
b. These conditions can include one or more of the following:
b.i. PDCCH message(s) for DL data "x" ms before MeasGap activation;
b.ii. UL data arrival "z" ms before MeasGap;
b.iii. Buffer status is over a certain level;
b.iv. Ongoing HARQ transmission/retransmission; or
b.v. Pending configured grant transmission.
c. The measurement gap can come without a condition but instead with a periodic setting, as follows.
c.i. To skip the measurement gap at a "y"-th attempt.
c.ii. Instead at this "y"-th attempt, initiate an SSB-measurement-specific BWP switch.
c.iii. The SSB-measurement-specific BWP switch should follow the measurement gap timings, i.e., initiate SSB-measurement-specific BWP switch when measurement gap is to be started.
c.iv. At the end of the measurement gap timing, the UE should initiate a switch back to its original BWP.

As additional detail, consider the following. For b.ii above, if there is UL data that arrives less than or equal to "z" ms before the MeasGap, the UE transitions to BWP B using the next measurement gap timing anyway, and the UE expects to send the UL data in BWP B. By contrast, if there is UL data that arrives greater than z ms before the MeasGap, the UE does not switch to the BWP B and measurement gap is used as before.

Similar steps are used for b.i above, where if there is a PDCCH message for DL data that arrives less than or equal to x ms before the MeasGap, the UE transitions to BWP B using the next measurement gap timing anyway, and the UE expects to receive the DL data in BWP B. If there is a PDCCH message for DL data that arrives greater than x ms before the MeasGap, the UE does not switch to the BWP B and measurement gap is used as before.

In step 4, in one scenario, the UE 110 receives a DL message "t" ms (or less) before a MeasGap. This fulfills the condition for next MeasGap occasion, using the MeasGap parameters as an SSB-measurement-specific BWP switch. It is noted that if the UE receives a DL message greater than "t" ms before a MeasGap, the UE determines the data will come using BWP A. It is noted that the PDCCH message for DL data in step 3 schedules UE for data in BWP B, and this is indicated to the UE explicitly. The DL message in step 4 is a DL message not related to PDCCH for DL data.

While the former one may indicate the existence of a DL data that UE can be informed about the details (PDSCH location can be communicated in BWP B) in BWP B.

For step 5, the UE switches the active BWP to BWP B and uses preconfigured control information after the SSB-measurement-specific BWP switch.

The network (e.g., the serving cell 101 and corresponding gNB 170) can, in step 6, further schedule the UE at the BWP B during the duration of the measurement gap. Note that this addresses the issue, described above, where DL comes in for the UE while the UE is in a measurement gap.

In step 6A, the UE measures the SSB(s) in the BWP B.

For step 7, after the duration of the MeasGap, e.g., 6 ms, the UE switches back to BWP A.

The network (the serving cell 101 in this example) directly starts scheduling PDCCH for the UE at the BWP A, as the network knows the UE has switched back to BWP A.

Figure 7:
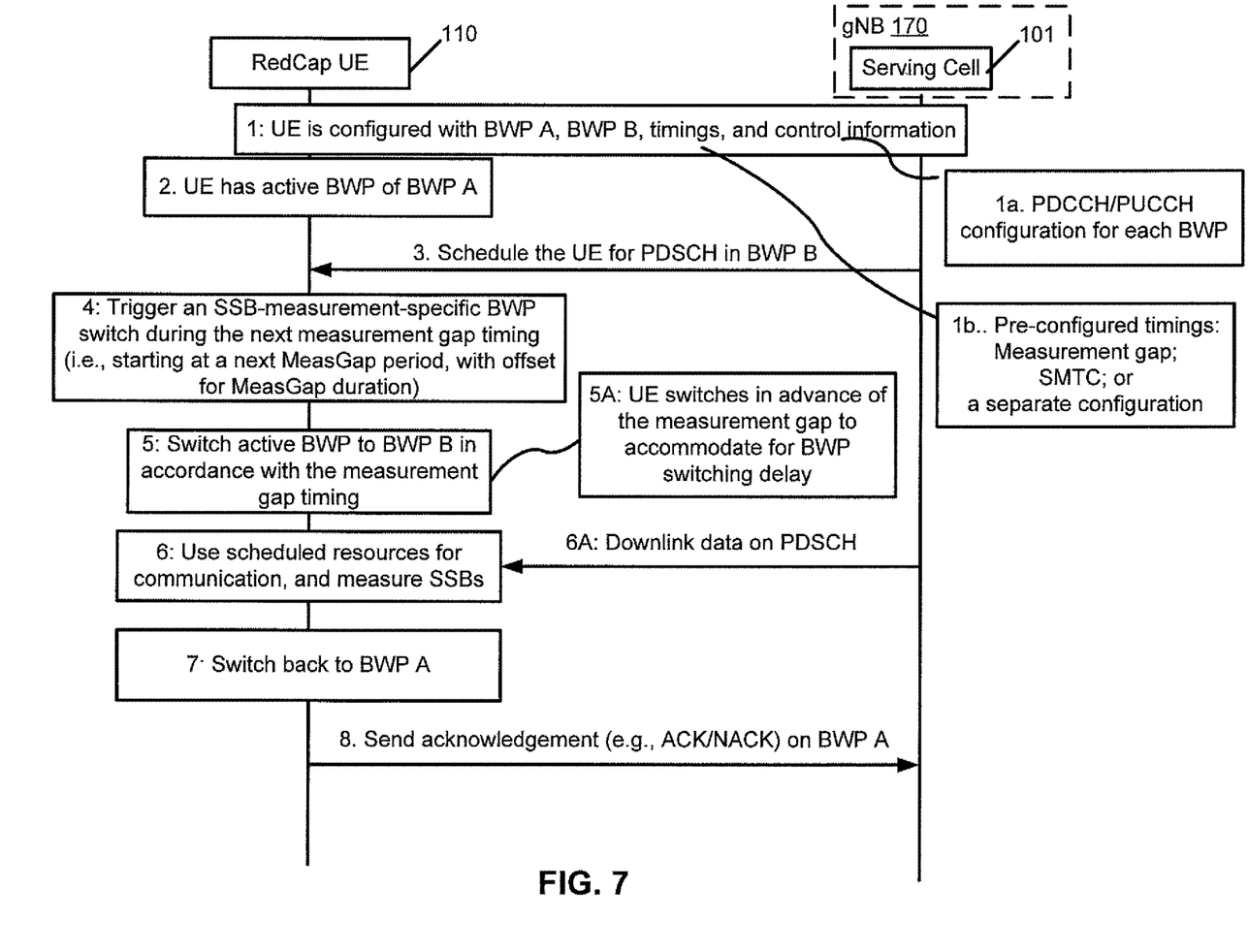
FIG. 7 is a signaling diagram for temporary bandwidth part switch for reduced capability devices, in accordance with an exemplary embodiment.

In an alternative embodiment, a BWP configuration comes without the control information (PDCCH/PUCCH configuration). This example includes the following and is described in reference to FIG. 7, which is a signaling diagram for temporary bandwidth part switch for reduced capability devices, in accordance with an exemplary embodiment. A UE 110 and a serving cell 101 are shown, where the serving cell 101 is formed and controlled by gNB 170, and steps 1 and 2 are as in FIG. 6. FIG. 7 also illustrates the operation of an exemplary method or methods, a result of execution of computer program instructions embodied on a computer readable memory, functions performed by logic implemented in hardware, and/or interconnected means for performing functions in accordance with exemplary embodiments. The operations in FIG. 7 are performed by the UE 110, e.g., under control of control module 140, and gNB 170, e.g., under control of control module 150.

For step 3, when the UE has an active BWP of BWP A, the gNB 170 (via its serving cell 101) schedules the UE for PDSCH in BWP B. In this example, the gNB already has data to send to the UE when the gNB sends the PDSCH details for BWP B.

The schedule command in BWP B triggers, in step 4, an SSB-measurement-specific BWP switch by the UE during the next measurement gap timing (i.e., starting at a next MeasGap period, with offset for MeasGap duration).

The UE 110 switches in step 5 the active BWP to BWP B, in accordance with the measurement gap timing.

The UE, in step 6, uses scheduled resources for communication, and the UE measures SSBs. In particular, the gNB 170 may send DL data in step 6A to the UE for the communications.

In step 7, the UE switches back to BWP A.

The UE in step 8 sends an acknowledgement, e.g., an ACK/NACK, on BWP A. In response to PDSCH data being received, the UE sends an ACK and sends a NACK in response to PDSCH data not being received.

It is noted that step 8 of FIG. 6 is also applicable to FIG. 7. That is, the network (NW) can schedule the UE at BWP A, as the NW knows the UE switched only during the MeasGap.

A note is now made about mapping of RF-retuning time to BWP switching delay. As BWP switching delay can be up to 3 ms, e.g., for UE type 2 (UE that works in FR2, where 3GPP TS 38.101 details this), a MeasGap duration of 6 ms may not be meaningful for such UEs. One solution would be to shift the start of temporary SSB-measurement-specific BWP switch to accommodate the time needed for BWP switching delay.

This is illustrated by step 5A, where the UE switches in advance of the measurement gap to accommodate for BWP switching delay. In the example of 3 ms BWP switching delay, this could entail the UE beginning to switch up to 3 ms before the beginning of the measurement gap. Additionally, although step 5A is used in FIG. 7, this step may also be applicable for FIG. 6 too, and for UEs other than type 2 UEs.

In case of UL data arrival at the UE side, this should be reported to the network, as such network would be aware of switch of the UE. This is for the case where data arrival while the UE is still at BWP A but a measurement gap is imminent. This reporting can be performed, for example, through a buffer status report within MAC. This means the issue described above where the UE has data while in a different BWP to measure SSBs during a measurement gap, is addressed, as the UE can communicate the data to the gNB 170.

Without in any way limiting the scope, interpretation, or application of the claims appearing below, a technical effect and advantage of one or more of the example embodiments disclosed herein is the UE can enjoy higher throughput and lower interruption time when this is needed, i.e., when a recent data has arrived or the UE has an increasing buffer length. Another technical effect and advantage of one or more of the example embodiments disclosed herein is the UE does not need to be re-configured with a new measurement gap. Another technical effect and advantage of one or more of the example embodiments disclosed herein is the UE does not need to be signaled a SSB-measurement-specific BWP switch.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
AMF access and mobility management function
BFD beam failure detection
BW bandwidth
BWP bandwidth part
CU central unit
DCI Downlink Control Information
DL downlink (from the network toward the UE)
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FR1 frequency range 1
FR2 frequency range 2
gNB (or gNodeB) base station for 5G/NR, i.e., a node providing NR user plane and control plane protocol terminations towards the UE, and connected via the NG interface to the 5GC
HARQ hybrid automatic retransmission request
I/F interface
LTE long term evolution
MAC medium access control
MGL measurement gap length
MME mobility management entity
ng or NG next generation
ng-eNB or NG-eNB next generation eNB
NR new radio
N/W or NW network
PBCH Physical Broadcast CHannel
PDCCH physical downlink control channel
PDCP packet data convergence protocol
PHY physical layer
PUCCH physical uplink control channel
RAN radio access network
RF radio frequency
RedCap reduced capacity
Rel release
RLC radio link control
RLM radio link monitoring
RRC radio resource control
RRH remote radio head
RRM radio resource management
RU radio unit
Rx receiver
SDAP service data adaptation protocol
SGW serving gateway
SI system information
SIB system information block
SMF session management function
SMTC SSB-based measurement timing configuration
SS synchronization signal
SSB synchronization signal block
TS technical specification
Tx transmitter
UE user equipment (e.g., a wireless, typically mobile device)
UPF user plane function

What is claimed is:

1. A method, comprising:
receiving, by a user equipment connected to a serving cell via an active bandwidth part comprising a first bandwidth part, a message comprising one or more criteria for switching from the first bandwidth part to a second bandwidth part based on measurement gap timing, wherein the user equipment can perform user plane communication in the second bandwidth part and the second bandwidth part has a synchronization signal block, wherein meeting the one or more criteria is to cause a switch from the first bandwidth part to the second bandwidth part to communicate by the user equipment and to measure the synchronization signal block in the second bandwidth part, and not meeting the one or more criteria is to cause measurement of a synchronization signal block in an other bandwidth part but without user plane communication by the user equipment;
performing one of the following:
(1) determining at least one of the one or more criteria has been met, and, in response:
waiting by the user equipment until a first preconfigured time for the measurement gap timing to switch from the first bandwidth part to the second bandwidth part;
switching by the user equipment the active bandwidth part from the first bandwidth part to the second bandwidth part;
communicating by the user equipment with the serving cell and performing by the user equipment synchronization signal block measurements while using the second bandwidth part as the active bandwidth part; and switching by the user equipment from the second bandwidth part to the first bandwidth part after a second preconfigured time for the measurement gap timing corresponding to a duration of time in the second bandwidth part; or (2) determining the one or more criteria have not been met, and, in response: performing, using the measurement gap timing, measuring of a synchronization signal block in the other bandwidth part but without user plane communication by the user equipment and switching back to the first bandwidth part.

2. An apparatus, comprising:
one or more processors; and
one or more memories storing instructions that, when executed by the one or more processors, cause the apparatus at least to perform:
receiving, by a user equipment connected to a serving cell via an active bandwidth part comprising a first bandwidth part, a message comprising one or more criteria for switching from the first bandwidth part to a second bandwidth part based on measurement gap timing, wherein the user equipment can perform user plane communication in the second bandwidth part and the second bandwidth part has a synchronization signal block, wherein meeting the one or more criteria is to cause a switch from the first bandwidth part to the second bandwidth part to communicate by the user equipment and to measure the synchronization signal block in the second bandwidth part, and not meeting the one or more criteria is to cause measurement of a synchronization signal block in an other bandwidth part but without user plane communication by the user equipment;
performing one of the following:
(1) determining at least one of the one or more criteria has been met, and in response:
waiting by the user equipment until a first preconfigured time to switch from the first bandwidth part to the second bandwidth part;
switching by the user equipment the active bandwidth part from the first bandwidth part to the second bandwidth part;
communicating by the user equipment with the serving cell and performing by the user equipment synchronization signal block measurements while using the second bandwidth part as the active bandwidth part; and
switching by the user equipment from the second bandwidth part to the first bandwidth part after a second preconfigured time corresponding to a duration of time in the second bandwidth part; or (2) determining the one or more criteria have not been met, and, in response: performing, using the measurement gap timing, measuring of a synchronization signal block in the other bandwidth part but without user plane communication by the user equipment and switching back to the first bandwidth part.

3. The apparatus of claim 2, wherein the first preconfigured time for the measurement gap timing corresponds to timing or timings for one of the following: a measurement gap; synchronization signal block-based measurement timing configuration; or a separate configuration.

4. The apparatus of claim 2, wherein the second preconfigured time for the measurement gap timing corresponds to timing or timings for one of the following: a measurement gap; synchronization signal block-based measurement timing configuration; or a separate configuration.

5. The apparatus of claim 2, wherein the one or more criteria comprise uplink data arriving in the user equipment for transmission within a predetermined time before the first preconfigured time to switch from the first bandwidth part to the second bandwidth part, wherein the at least one of the one or more criteria is met when the uplink data arrives in the user equipment for transmission within the predetermined time, and wherein the at least one of the one or more criteria is not met when the uplink data arrives in the user equipment for transmission at a time greater than the predetermined time.

6. The apparatus of claim 2, wherein the one or more criteria comprise a physical downlink control channel message for downlink data for the user equipment being signaled to the user equipment within a second predetermined time before the first preconfigured time to switch from the first bandwidth part to the second bandwidth part, wherein the at least one of the one or more criteria is met when the physical downlink control channel message for downlink data for the user equipment is signaled to the user equipment within the second predetermined time, and wherein the at least one of the one or more criteria is not met when the physical downlink control channel message for downlink data for the user equipment is signaled to the user equipment at a time greater than the second predetermined time.

7. The apparatus of claim 2, wherein the one or more criteria comprise a downlink message being signaled to the user equipment within a third predetermined time before the first preconfigured time to switch from the first bandwidth part to the second bandwidth part, wherein the at least one of the one or more criteria is met when the downlink message is signaled to the user equipment within the third predetermined time, and wherein the at least one of the one or more criteria is not met when the downlink message is signaled to the user equipment at a time greater than the third predetermined time.

8. The apparatus of claim 2, wherein the one or more criteria comprise a message, which can be received by the user equipment while the user equipment uses the first bandwidth part as the active bandwidth part, able to schedule the user equipment for a physical downlink shared channel on the second bandwidth part, wherein the at least one of the one or more criteria is met when the message is received, and wherein the at least one of the one or more criteria is not met when the message is not received.

9. The apparatus of claim 2, wherein one or more timers are used to decide when to perform the switching from the first bandwidth part to the second bandwidth part and from the second bandwidth part to the first bandwidth part.

10. The apparatus of claim 2, wherein the one or more memories further store instructions that, when executed by the one or more processors, cause the apparatus to receive by the user equipment scheduling in the first bandwidth part for downlink data after user equipment performs the switching from the second bandwidth part to the first bandwidth part, the receiving scheduling performed without the user equipment signaling to the serving cell that the user equipment had switched back to the first bandwidth part.

11. The apparatus of claim 2, wherein the user equipment is preconfigured to perform periodic switching from the first bandwidth part to the second bandwidth part at each y-th measurement gap occurrence or y-th separate configuration, $y \geq 1$, as long as the user equipment does not receive a trigger from the serving cell that overrides the periodic switching.

12. The apparatus of claim 2, wherein one or more criteria comprise a measurement-gap-based switch flag indication in downlink control information that acts as a command to cause at least the switching from the first bandwidth part to the second bandwidth part and use timings for the measurement gap timing of a next measurement gap.

13. The apparatus of claim 8, wherein the message is received by the user equipment, wherein the user equipment is preconfigured to send an acknowledgement message in the first bandwidth part after the user equipment switches from the second bandwidth part to the first bandwidth part, the acknowledgement message corresponding to a scheduled transmission, based on scheduling in the message, on the physical downlink shared channel in the second bandwidth part.

14. The apparatus of claim 9, wherein the one or more timers are based, for the measurement gap timing, one or more of measurement gap timing parameters, measurement gap duration, or measurement gap offset.

15. An apparatus, comprising:
one or more processors; and
one or more memories storing instructions that, when executed by the one or more processors, cause the apparatus at least to perform:
at a serving cell connected to a user equipment via a first bandwidth part as an active bandwidth part, sending by the serving cell a message to the user equipment comprising one or more criteria for switching from the first bandwidth part to a second bandwidth part based on measurement gap timing, wherein the user equipment can perform user plane communication in the second bandwidth part and the second bandwidth part has a synchronization signal block, wherein meeting the one or more criteria is to cause a switch from the first bandwidth part to the second bandwidth part to communicate by the user equipment and to measure the synchronization signal block in the second bandwidth part, and not meeting the one or more criteria is to cause measurement of a synchronization signal block in an other bandwidth part but without user plane communication by the user equipment;
performing one of the following:
(1) determining at least one of the one or more criteria has been met, and in response:
determining, based on a first preconfigured time for the measurement gap timing the user equipment is to switch from the first bandwidth part to the second bandwidth part, when the user equipment is to have switched to the second bandwidth part;
communicating by the serving cell with the user equipment while the user equipment uses the second bandwidth part as the active bandwidth part and outputting a synchronization signal block;
after a second preconfigured time for the measurement gap timing corresponding to a duration of time in the second bandwidth part, switching by the serving cell to the first bandwidth part for use for communication with the user equipment as the active bandwidth part; or (2) determining the one or more criteria have not been met, and, in response: determining the user equipment is not available for scheduling until the user equipment switches back to the first bandwidth part.

16. The apparatus of claim 15, wherein the first preconfigured time for the measurement gap timing corresponds to timing for one of the following: a measurement gap; synchronization signal block-based measurement timing configuration; or a separate configuration, and wherein the second preconfigured time for the measurement gap timing corresponds to timing for one of the following: a measurement gap; synchronization signal block-based measurement timing configuration; or a separate configuration.

17. The apparatus of claim 15, wherein the one or more criteria comprise a physical downlink control channel message for downlink data for the user equipment being signaled to the user equipment within a second predetermined time before the first preconfigured time to switch from the first bandwidth part to the second bandwidth part, and signaling by the serving cell the physical downlink control channel message for the downlink data to the user equipment, wherein the at least one of the one or more criteria is met when the physical downlink control channel message for downlink data for the user equipment is signaled to the user equipment within the second predetermined time, and wherein the at least one of the one or more criteria is not met when the physical downlink control channel message for downlink data for the user equipment is signaled to the user equipment at a time greater than the second predetermined time.

18. The apparatus of claim 15 wherein the one or more criteria comprise a downlink message being signaled to the user equipment within a third predetermined time before the first preconfigured time to switch from the first bandwidth part to the second bandwidth part, and signaling by the serving cell the downlink message to the user equipment, wherein the at least one of the one or more criteria is met when the downlink message is signaled to the user equipment within the third predetermined time, and wherein the at least one of the one or more criteria is not met when the downlink message is signaled to the user equipment at a time greater than the third predetermined time.

19. The apparatus of claim 15, wherein the one or more criteria comprise a message, which can be received by the user equipment while the user equipment uses the first bandwidth part as the active bandwidth part, able to schedule the user equipment for a physical downlink shared channel on the second bandwidth part, wherein the at least one of the one or more criteria is met when the message is sent by the serving cell to the user equipment, and wherein the at least one of the one or more criteria is not met when the message when the message is not sent by the serving cell to the user equipment.

* * * * *